United States Patent Office 3,108,898
Patented Oct. 29, 1963

3,108,898
ADHESION OF SILICONE RUBBER TO SURFACES
Siegfried Nitzsche and Manfred Wick, both of Burghausen, Bavaria, Germany, assignors to Wacker-Chemie G.m.b.H., Munich, Bavaria, Germany
No Drawing. Filed May 22, 1961, Ser. No. 111,505
Claims priority, application Germany May 25, 1960
8 Claims. (Cl. 117—75)

This invention relates to a new and greatly improved method for adhering silicone rubber to a wide variety of surfaces.

Bonding silicone rubber, which is based on diorganosiloxane polymers and copolymers, to surfaces such as metal, plastics, wood, paper and even cloth, has proved to be a difficult undertaking. It has been found that it is generally necessary to prepare the surface to be coated by a careful cleaning followed by application of a priming agent.

This problem of adhesion is encountered when heat vulcanized silicone rubbers are employed. However, the problem is even more severe when the more recently developed low temperature vulcanizing silicone rubbers are employed.

One method frequently employed to obtain the desired adhesion consists of priming the base member with an organosilicate or an organopolysilicate. The silicate or polysilicate can be applied per se or admixed into silicone rubber formulations.

In any case, the priming agents based on organosilicates and organopolysilicates have uncertain drying periods. The drying period for such priming agents varies with temperature, humidity and even the nature of the base. As would be expected the priming agents dry more rapidly at high temperatures. The variation with humidity is even more critical because at low humidity the drying time is impractically long while at very high humidity the primer coating will be unsatisfactorily adherent. Finally, the nature of the base member is significant insofar as the drying rate of the priming agent. Even with chemically similar materials such as iron and steel the rate of drying will vary. It is apparent the variation in drying rate and the variation in effectiveness of the known priming agents results in processing difficulties preventing widespread use of the silicone rubber as a coating agent.

Of course it is often the possible to shorten drying time and improve the bonding effect of priming agents by heating the primed article. However, for base articles deleteriously affected by heat and for large articles difficult to heat, the optional use of heat for drying is impractical or impossible. Furthermore, and very basic to the problem, the known priming agents are generally ineffective on such widely used base materials as copper, copper alloys, paper and wood.

It is the primary object of this invention to introduce a novel priming agent for use in bonding silicone rubber to base members. Another object is to introduce a priming agent exhibiting specific and definite drying time. A further object is a priming agent producing superior bonding between silicone rubber and a wide variety of base members. Other objects and advantages of this invention are disclosed in or are apparent from the disclosure and claims following.

This invention comprises a priming agent for bonding consisting of an organosilicate or an organopolysilicate mixed with a complex-former or a chelate-former.

The organosilicates employed herein are liquid materials of the formula $R_nSi(OR')_{4-n}$ where $n$ is 0, 1 or 2 and each R is a monovalent radical selected from alkyl, cycloaliphatic, aryl, aralkyl, alkenyl and alkaryl radicals and halogenated derivatives of the alkyl, cycloaliphatic, aryl, aralkyl, alkenyl and alkaryl groups and each R' is an alkyl radical or an halogenoalkyl radical. Also operative are liquid organic solvent soluble partial hydrolyzates of the defined organosilicates including organopolysilicates and organoalkoxysiloxanes. In all of the silicates and alkoxylated siloxanes, each R can be a monovalent hydrocarbon radical or a halogenated monovalent hydrocarbon radical such as an alkyl radical such as methyl, ethyl, propyl, butyl, nonyl and octadecyl; an aryl radical such as phenyl, diphenyl and anthracyl; an alkaryl radical such as tolyl, xylyl, ethylphenyl and methylnapthyl; an aralkyl radical such as benzyl and phenylethyl; an alkenyl radical such as vinyl, allyl and pentenyl; a cycloaliphatic radical such as cyclopropyl, cyclobutyl, cyclohexyl, cyclohexenyl, cyclopropenyl, and cyclopropyl; as well as any halogenated derivative of the foregoing radicals such as chloromethyl, perfluoroethyl, 3,3,3 - trifluoropropyl, chlorofluorovinyl, bromophenyl, trichlorotolyl and bromobenzyl. Each R' in the formula can be any alkyl radical or halogenoalkyl radical as above illustrated.

The operable silicates and polysilicates can be exemplified by alkylsilicates, alkylpolysilicates, alkyltrialkoxysilanes, aryltrialkoxysilanes, dialkyldialkoxysilanes, hexaethoxydisiloxane, triphenylpenta-ethoxytrisiloxane, octabutoxytrisiloxane and 1-phenyl-2,2 vinyl methyltriethoxydisiloxane. The operable polysilicates or alkoxylated siloxanes include fluid materials having low molecular weight and sufficiently non-volatile to evaporate at a reasonable rate, e.g. evaporate within 5 minutes to 5 hours. In general, the operable polymeric silicates are limited to those polymers having less than 10 silicon atoms in the molecules.

The novel ingredient herein is the complex-former or chelate-former. This additive is employed in quantities of at least one percent by weight and preferably 10 to 25 percent by weight based on the weight of the silicate ingredient. The desired effects are not achieved with significantly less than one percent by weight of the additive. However, one may employ greater than 25 percent by weight of the additive (e.g. up to 50 percent by weight) without deleterious effect because the additive will merely act as a diluent. The preferred 25 percent maximum is a practical or commercial upper limit rather than an operative limit.

The complex- and chelate-forming additives found suitable herein as beta-diketones, ketoacid esters, nitrophenols, dioximes and keto alcohols. Examples of the operative complex- and chelate-formers are acetyl acetone, 2,4-hexanedione, 2,4-heptanedione, 5-methyl-2,4-hexanedione, 2,4-octenedione, 5,5-dimethyl-2,4-hexanedione, 3-ethyl-2,4-pentanedione, 3,3-diethyl-2,4-pentanedione, 2,2-dimethyl-3,5-nonanedione, 1-cyclohexyl-1,3-butanedione, 5,5 - dimethyl-1,3-cyclohexanedione, 1-phenyl-5,5-dimethyl - 2,4-hexanedione and compounds of the formula

YCOCH$_2$COY' where Y and Y' are monovalent hydrocarbon or substituted hydrocarbon radicals; diacetone alcohol, benzoin, acetol, acetoin, acetropropanol and alpha-hydroxyketones of the formula YCHOHCOY'; acetoacetic ester and alkyl acetoacetates and aryl acetoacetates; mono-, di- and trinitrophenols such as o-nitrophenol, m-nitrophenol, p-nitrophenol, 2,4-dinitrophenol, 2,6-dinitrophenol, picric acid, and 2-diazo-4,6-dinitrophenol; diphenyl glyoxime, glyoxal dioxime, dimethyl glyoxime, methylphenyl glyoxime, quinone dioxime, alpha-furil dioxime, cyclohexanedione dioxime and benzoyl methyl glyoxime. Particularly useful herein are the beta-diketones and especially acetylacetone.

In addition to the silicate ingredient and the chelate-former, the compositions employed as primers herein can contain as additives minor amounts, i.e., .01 to 1 percent by weight of the composition, of metal salts, acid and/or organochlorosilanes as drying accelerators. The use of such additives is optional. Particularly useful in this connection are iron chloride, aluminum chloride, zinc chloride, titanium and zirconium tetrachlorides, silica tetrachloride, HCl, $(CH_3)_2SiCl_2$, dimethyltetrachlorodisiloxane and corresponding fluorides and bromides as well as nitrates, sulfates, acetates and so forth.

The base members employed herein can be selected from a very wide variety of solid bases. Particularly useful are metals, synthetic organic plastics such as nitro cellulose plastics, cellulose acetate plastics, phenoplasts, casein plastics, coumarone resins, urea and melamine plastics, polyamides, vinylidene chloride plastics polystyrenes, polyvinyl carbazoles, lignin plastics and silicone resins, alloys, wood, paper, glass and other ceramics, and cellulosic materials as well as leather and natural organic rubber, synthetic organic rubber, silicone rubber and halogenohydrocarbon rubbers and resins.

The ingredients are admixed in any desired order. It is permissible and within the scope of this invention to employ organic solvent solutions of the silicate ingredient, chelate-former and additives.

The priming agent is applied to the base member in any desired manner such as spraying, dipping, flowing, painting or roller coating. The coating of priming agent is air dried. The drying can be accelerated by heating if desired, but generally temperatures above 200° C. are not advisable because too rapid drying of the coating results in an unsatisfactory priming coat and unsatisfactory bonding.

The silicone rubber is deposited on the primed surface in any desired manner. For example, vulcanized sheets of the rubber can be applied to the surface and bonded under light pressure at temperatures up to 200° C. Alternatively an unvulcanized silicone rubber stock can be extruded, calendered, doctored or otherwise applied to the primed surface and vulcanized in the normal manner.

The silicone rubber employed herein is based upon diorganosiloxane polymers and contains fillers, vulcanizing agents, pigments and other known materials. Such materials are well known as fully disclosed in the art in such references as: "Silicones and Their Uses," by R. R. McGregor, pages 149–185; "Chemistry of the Silicones," second edition, by E. G. Rochow, pages 94–96; "Organosilicon Compounds," by C. Eaborn, pages 255, 458–459, 462, and United States Patent Numbers 2,843,555 (cf. U.S. application Serial No. 602,081, filed August 3, 1956); 2,541,137; 2,561,177; 2,568,672; 2,571,039; 2,572,227; 2,658,882; 2,460,795; 2,480,620; 2,560,498; 2,842,516; 2,684,957; 2,718,512; 2,723,964; 2,723,966; 2,728,743; 2,759,904; 2,803,619; 2,819,236; 2,833,742; 2,842,520; 2,863,846; 2,890,188; 2,902,467; 2,927,907; 2,927,908 and 2,934,515.

Much of the prior art in adhesion of silicone rubber to base members is found in U.S. Patent Nos. 2,615,861; 2,634,285; 2,643,964 and 2,979,420.

The following examples are set forth in order that those skilled in the art may better understand how this invention may be practiced. The examples are given by way of illustration and not by way of limitation. All parts and percentages are based on weight unless otherwise stated. Me, Ph, Et and Vi represent the methyl, phenyl, ethyl and vinyl radicals respectively.

*Example 1*

Priming agent A was prepared by mixing 30 parts [Me$_2$EtOSi]$_{20}$, 70 parts

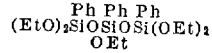

and 0.1 part iron chloride. A layer .01 mm. thick of priming agent A was applied to the surface of glass, iron, steel, copper, brass, aluminum, wood, paper, and polymethyl methacrylate. The primer coating was dried at room temperature and at 65 percent relative humidity. The time required for the priming agent to dry to a tack-free surface on each surface was as follows: glass—5 minutes; iron—10 hours; steel—25 hours; copper—4 hours; brass—8 hours; aluminum—15 minutes; wood—2 days; paper—1 hour; and polymethyl methacrylate—2 hours. A silicone rubber stock, vulcanizable at room temperature, was prepared by mixing 100 parts hydroxyl endblocked dimethylsiloxane polymer of 30,000 cs. at 25° C., 50 parts quartz flour, 3 parts hexaethoxydisiloxane and 1.5 parts dibutyl tin dilaurate. The silicone rubber stock was applied to the tack-free primed surfaces and allowed to vulcanize. Vulcanization occurred within 10 hours and after 10 hours the adhesion of the rubber to the primed surface was tested. A wide variation in adhesion was found with acceptable adhesion to glass, iron and aluminum and practically no adhesion to the steel, copper, brass, wood, paper and polymethyl methacrylate.

Priming agent B was prepared exactly as priming agent A but in addition B contained 15 parts acetyl acetone. Priming agent B was applied as a .01 mm. layer on glass, iron, steel, copper, brass, aluminum, wood, paper and polymethyl methacrylate, the same surfaces as employed with agent A. Priming agent B air-dried at room temperature and 65 percent relative humidity within 5 minutes on aluminum, wood, paper and polymethyl methacrylate and within 2 minutes on glass, iron, steel, copper and brass. The rubber stock described above was applied to the primed surfaces in the same manner employed with priming agent A. Uniformly excellent adhesion was obtained on all primed surfaces after the 10 hour vulcanization period at room temperature. The adhesion of the rubber to the base member surpassed the cohesion of the rubber or base member and tearing did not occur in the bond but in the rubber or base-member.

The procedures followed with priming agent A and priming agent B were in all respects identical except for the inclusion of the chelate-former in B. Following exactly the same procedure but with 15 parts acetoacetic ester in primer C and 25 parts diacetone alcohol in primer D, in place of the acetyl acetone in primer B, excellent bonding between the described rubber stock and each of the base members was achieved.

*Example 2*

A priming agent E was prepared by mixing 80 parts Ph(EtO)$_2$SiOSi(OEt)MeVi, 20 parts

and .1 part TiCl$_4$. A sheet of brass was coated with a portion of priming agent E and the balance of the priming agent was mixed with sufficient picric acid to give 3 parts picric acid per 100 parts of the disiloxanes, to produce priming agent F. Priming agent F was also applied to a sheet of brass. The primer coatings were identical in thickness and were on identical brass sheets. The primer coatings were dried to a tack-free state at room temperature and 65 percent relative humidity. Primer agent E dried in 8 hours and primer agent F dried in 5 minutes. A silicone rubber stock was prepared by mixing 100 parts of a copolymeric gum containing 99.8 mol percent

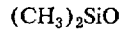

units and 0.2 mol percent ViMeSiO units, 40 parts precipitated silica, 20 parts diatomaceous earth and 1.5 parts dicumyl peroxide. The silicone rubber stock was sheeted and sections of the sheet were applied to the brass sheets which had been primed with priming agents F and E. The assemblies were press-molded for 10 minutes at 150° C. and removed from the press and cooled. The silicone rubber did not adhere to the brass sheet primed with priming agent E. The silicone rubber was uniformly and firmly bonded to the brass sheet primed with priming agent F. The bond to the sheet primed with F was such that the adhesion exceeded the cohesion of the rubber layer and the rubber tore internally without alternation of the bond.

Example 3

Equivalent results were achieved when wood was primed with priming agents identical to priming agent F but containing in place of the 3 parts picric acid, 5 parts acetyl acetone, 10 parts 2,4-heptane dione, 10 parts diphenyl glyoxime, 10 parts methylphenyl glyoxime, 10 parts of an alkyl acetoacetate, 5 parts 2,6-dinitrophenol, 10 parts benzoin, 10 parts acetoin or 5 parts 1-cyclohexyl-1,3 butanedione and the silicone rubber layer was as described in Example 2.

Example 4

When Example 1 was repeated employing priming agent B modified by substituting for the mixture of disiloxane and trisiloxane 100 parts of any of the following listed materials, equivalent results were achieved: ethylsilicate, ethylpolysilicate, methyltriethoxysilane, trimethyltrimethoxydiethoxytrisiloxane, and dimethyldiethoxysilane.

Example 5

When a priming agent consisting of 100 parts

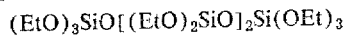

and 10 parts acetylacetone, 10 parts acetoacetic ester, 20 parts diacetone alcohol or 5 parts picric acid, was applied to the surfaces of glass, brass, copper, steel, paper and polystyrene, and was air-dried at room temperature for 15 minutes or less, a 2 mil coating of silicone rubber comprising 100 parts hydroxyl endblocked dimethylsiloxane polymer of 75,000 cs. at 25° C., 40 parts fume silica, 4 parts ethylorthosilicate and 2 parts dibutyl tin dilaurate, vulcanized within 10 hours to form a firmly adherent coating on said surfaces.

That which is claimed is:

1. A priming agent for bonding silicone rubber to solid base members consisting essentially of a mixture of (1) 100 parts by weight of a liquid organosilicate selected from the group consisting of (A) silanes of the formula $R_nSi(OR')_{4-n}$ wherein each R is a monovalent radical selected from the group consisting of hydrocarbon radicals and halogenated hydrocarbon radicals, each R' is a monovalent radical selected from the group consisting of alkyl and halogenoalkyl radicals and n has an average value of from 0 to 2 inclusive, and (B) partial hydrolyzates of the defined silanes selected from the group consisting of alkylpolysilicates and organoalkoxysiloxanes wherein the organic radicals are monovalent radicals selected from the group consisting of hydrocarbon and halogenohydrocarbon radicals and the ratio of organic radicals to silicon atoms is not greater than 2, said partial hydrolyzates containing less than 10 silicon atoms per molecule, and (2) at least 1 part by weight of a compound selected from the group consisting of beta-diketones, ketoacid esters, nitrophenols, dioximes and keto alcohols.

2. The composition of claim 1 further characterized in that it contains (3) .01 to 1.0 part by weight of a compound selected from the group consisting of metal chlorides, inorganic acids and alkylchlorosilanes.

3. A method of bonding silicone rubber to a solid base member consisting of (A) applying a coating of the priming agent of claim 1, (B) permitting the priming agent to dry, and (C) thereafter applying a layer of unvulcanized silicone rubber and (D) vulcanizing the rubber.

4. A priming agent for bonding silicone rubber to solid base members selected from the group consisting of glass, wood, paper, metals, alloys and synthetic organic plastics consisting of a mixture of (1) 100 parts by weight of a silane of the formula $R_nSi(OR')_{4-n}$ where each R is a monovalent hydrocarbon radical, each R' is an alkyl radical and n is a number selected from 0 and 1, and (2) 1 to 50 parts by weight of a chelate-former selected from the group consisting of beta-diketones, ketoacid esters, nitrophenols, dioximes and keto alcohols.

5. The priming agent of claim 4 wherein the R' is ethyl, n is 0 and the chelate-former is acetyl acetone.

6. The compositions of claim 4 further characterized in that it contains (3) .01 to 1.0 part by weight of a compound selected from the group consisting of iron chloride, aluminum chloride, zinc chloride, titanium tetrachloride, zirconium tetrachloride, silicon tetrachloride, hydrogen chloride, dialkyldichlorosilane and dialkyltetrachlorodisiloxane.

7. A priming agent for bonding silicone rubber to solid base members consisting essentially of 100 parts by weight of a polymer selected from the group consisting of alkylpolysilicates and organoalkoxysiloxanes wherein the organic substituents are monovalent hydrocarbon radicals and the organic substituent to silicon atom ratio is not greater than 2, said polymer containing an average of less than 10 silicon atoms per molecule, 1 to 50 parts by weight of a chelate-former selected from the group consisting of beta-diketones, keto acid esters, nitrophenols, dioximes and keto alcohols.

8. The priming agent of claim 7 further characterized in that it contains (3) .01 to 1.0 part by weight of a metal chloride.

References Cited in the file of this patent
UNITED STATES PATENTS

| | | |
|---|---|---|
| 2,465,296 | Swiss | Mar. 22, 1949 |
| 2,643,964 | Smith-Johannsen | June 30, 1953 |
| 2,776,918 | Bersworth | Jan. 8, 1957 |

UNITED STATES PATENT OFFICE
CERTIFICATE OF CORRECTION

Patent No. 3,108,898            October 29, 1963

Siegfried Nitzsche et al.

It is hereby certified that error appears in the above numbered patent requiring correction and that the said Letters Patent should read as corrected below.

Column 1, line 66, for "thracyl; an alkaryl radical such as tolyl, xylyl, ethyl-" read -- silicone rubber to a base member said priming agent --.

Signed and sealed this 8th day of December 1964.

(SEAL)
Attest:

ERNEST W. SWIDER
Attesting Officer

EDWARD J. BRENNER
Commissioner of Patents